United States Patent [19]
Agarwal et al.

[11] 3,735,207
[45] May 22, 1973

[54] VEHICLE OPERATION INHIBITOR CONTROL SYSTEM

[75] Inventors: Paul D. Agarwal, Birmingham; Richard W. Johnston, Troy; John G. Neuman, Grosse Pointe, all of Mich.

[73] Assignee: General Motors Corporation, Detroit, Mich.

[22] Filed: Nov. 26, 1971

[21] Appl. No.: 202,144

[52] U.S. Cl. .................317/134, 180/99, 200/42, 200/44, 307/10 R
[51] Int. Cl. ..................................E05b 49/00
[58] Field of Search..............200/42, 43, 44, 45; 307/10 R, 10 AT, 10 BP; 180/99; 317/134

[56] References Cited
UNITED STATES PATENTS 3,641,396  2/1972  Kossen et al. ....................317/134
3,610,943  10/1971  Jones ..........................307/10 AT

*Primary Examiner*—J. D. Miller
*Assistant Examiner*—Harry E. Moose, Jr.
*Attorney*—Eugene W. Christen, Creighton R. Meland and Albert F. Duke

[57] ABSTRACT

A manually operable switch mechanism for enabling a control device which normally inhibits operation of the vehicle includes inner and outer rotatably supported concentrically mounted plate members provided with slots adapted to receive the vehicle ignition key. The inner and outer members are coupled so that rotation of the inner member in one direction produces rotation of the outer member in the opposite direction to reorient the positions of the slots in the two members. Circuitry is provided for energizing the control means and permitting operation of the vehicle in response to insertion of the ignition key in the slot in a predetermined sequence and within a predetermined time duration.

5 Claims, 4 Drawing Figures

Patented May 22, 1973

INVENTORS
Paul D. Agarwal,
Richard W. Johnston &
BY John G. Neuman
Albert F. Duke
ATTORNEY INVENTORS
Paul D. Agarwal,
Richard W. Johnston &
John G. Newman
BY Albert F. Duke
ATTORNEY

VEHICLE OPERATION INHIBITOR CONTROL SYSTEM

This invention relates to a vehicle operation inhibitor control system and more particularly to a system which inhibits vehicle operation until the operator has successfully performed a test designed to determine whether his ability to safely operate the vehicle has been impaired.

It is an object of the present invention to provide an inexpensive physiological testing device which requires the vehicle operator to display the mental and physical capabilities necessary to safely operate the vehicle before the vehicle can be started.

It is another object of the present invention to provide an inexpensive physiological testing device which includes a switch mechanism, for operating electrical control circuitry, which mechanism is actuable by insertion of the vehicle ignition key in a plurality of slots and which is adapted to reorient the position of the slots so as to provide a new test procedure each time the vehicle is to be started.

These and other objects of the present invention are obtained by apparatus which includes a switch mechanism provided with a pair of rotatably mounted concentric plates provided with slots for receipt of an ignition key. A contact assembly located adjacent the slots is actuable by insertion of the key in the slots provided and actuates control circuitry which permits energization of the starter solenoid of the vehicle if the ignition key is inserted in the slots in a predetermined sequence and during a predetermined time interval. One of the plates is provided with an additional slot for insertion of the ignition key to rotate the plates to reorient the slots.

A more complete understanding of the present invention may be had from the following detailed description taken in conjunction with the drawings in which.

Figure 1:
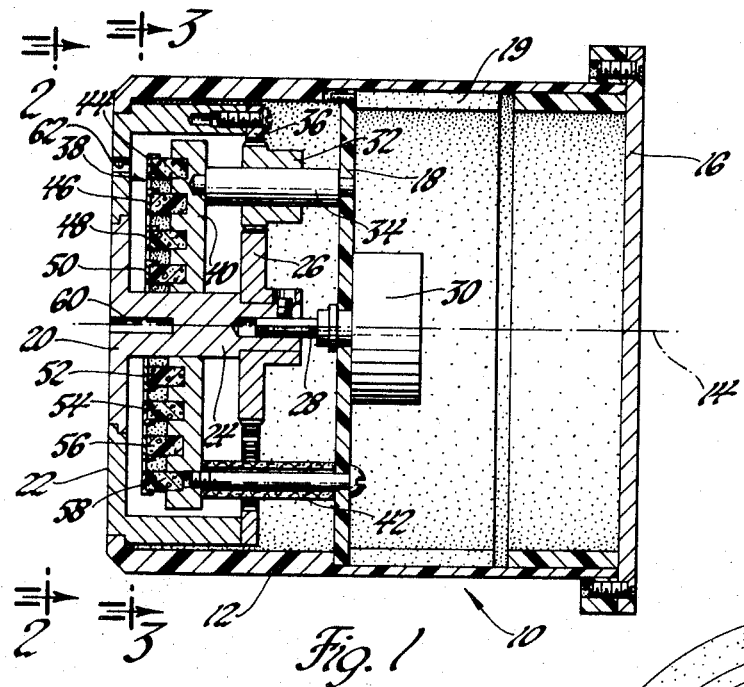
FIG. 1 is a partial sectional view of the switch mechanism of the present invention.
Figure 2:
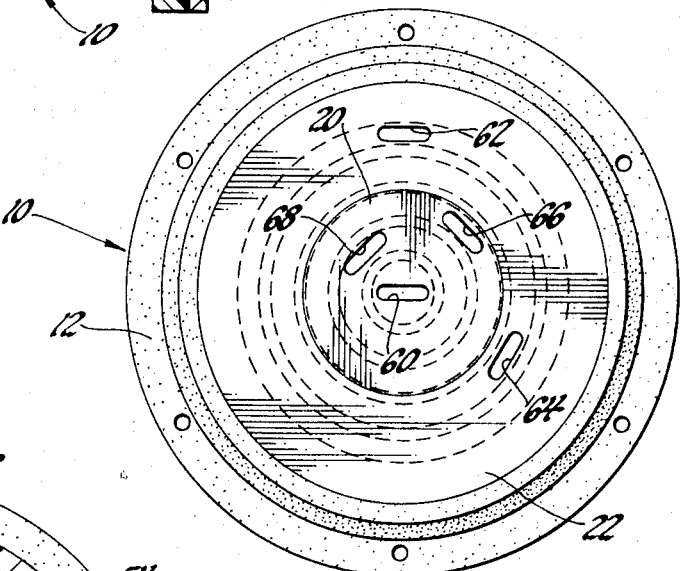
FIG. 2 is a front elevational view taken along lines 2—2 of FIG. 1.
Figure 3:
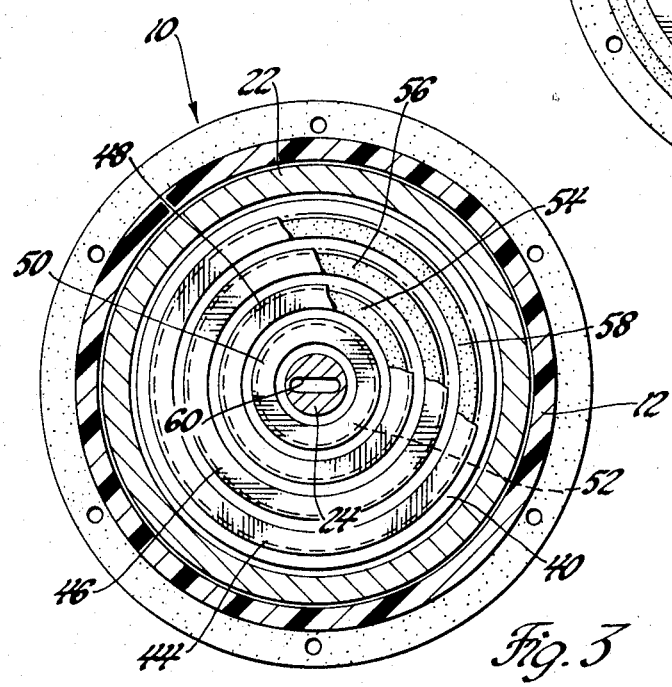
FIG. 3 is a sectional view taken along lines 3—3 of FIG. 1.

Referring now to the drawings and initially to FIGS. 1-3 the apparatus of the present invention comprises a manually operable switch mechanism generally designated 10 which includes a housing 12 of substantially cylindrical shape and having a longitudinal axis 14. The housing 12 is closed at one end by a cover 16 and is provided with a centrally located support member 18 spaced from the cover 16 by a spacer 19. The mechanism 10 is closed at e end opposite the cover 16 by inner and outer concentric plate members 20 and 22 respectively. The inner member 20 is provided with an inwardly directed shaft 24 which carries a spur gear 26. The shaft 24 receives a switch actuating shaft 28 which is keyed thereto and rotatable therewith and which extends through the support plate 18 for actuating a rotary switch generally designated 30 mounted to the support plate 18. The spur gear 26 engages an idler gear 32 which is rotatably supported by an idler gear shaft 34 which in turn is supported by the support plate 18. The idler gear 32 is in driving engagement with a gear 36 secured to the outer plate 22. The gears 26, 32 and 36 produce counterclockwise rotation of the outer plate 22 in response to clockwise rotation of the inner plate 20. Momentary contact switch means generally designated 38 include a grounding switch plate 40 which is journalled on the shaft 24 and spaced from the support plate 18 by three spacers 42 (only one is shown in the drawing). The switch plate 40 provides an electrical ground and is adapted to be engaged by a plurality of concentric contact rings 44, 46, 48, and 50 which are normally biased away from the plate 40 by spring means which take the form of concentric foam rubber rings 52, 54, 56, and 58. The foam rubber rings 52 through 58 are mounted in concentric slots formed in the plate 40 and support the contact rings 44 through 50.

The inner plate 20 is provided with a centrally located slot 60 which is adapted to receive a vehicle ignition key for rotating the inner plate 20. The output plate 22 is provided with additional slots 62 and 64 located at different distances from the axis 14 and along different radii extending from the axis 14. The inner member 20 is similarly provided with slots 66 and 68 at different distances from the axis 14 and along different radii extending from the axis 14. The concentric contact rings 44 through 50 are located adjacent the slots 62 through 68 respectively. Each of the contact rings 44 through 50 has an electrical lead (not shown) connected therewith which is grounded in response to contact between the rings 44 through 50 and the disc 40.

Figure 4:
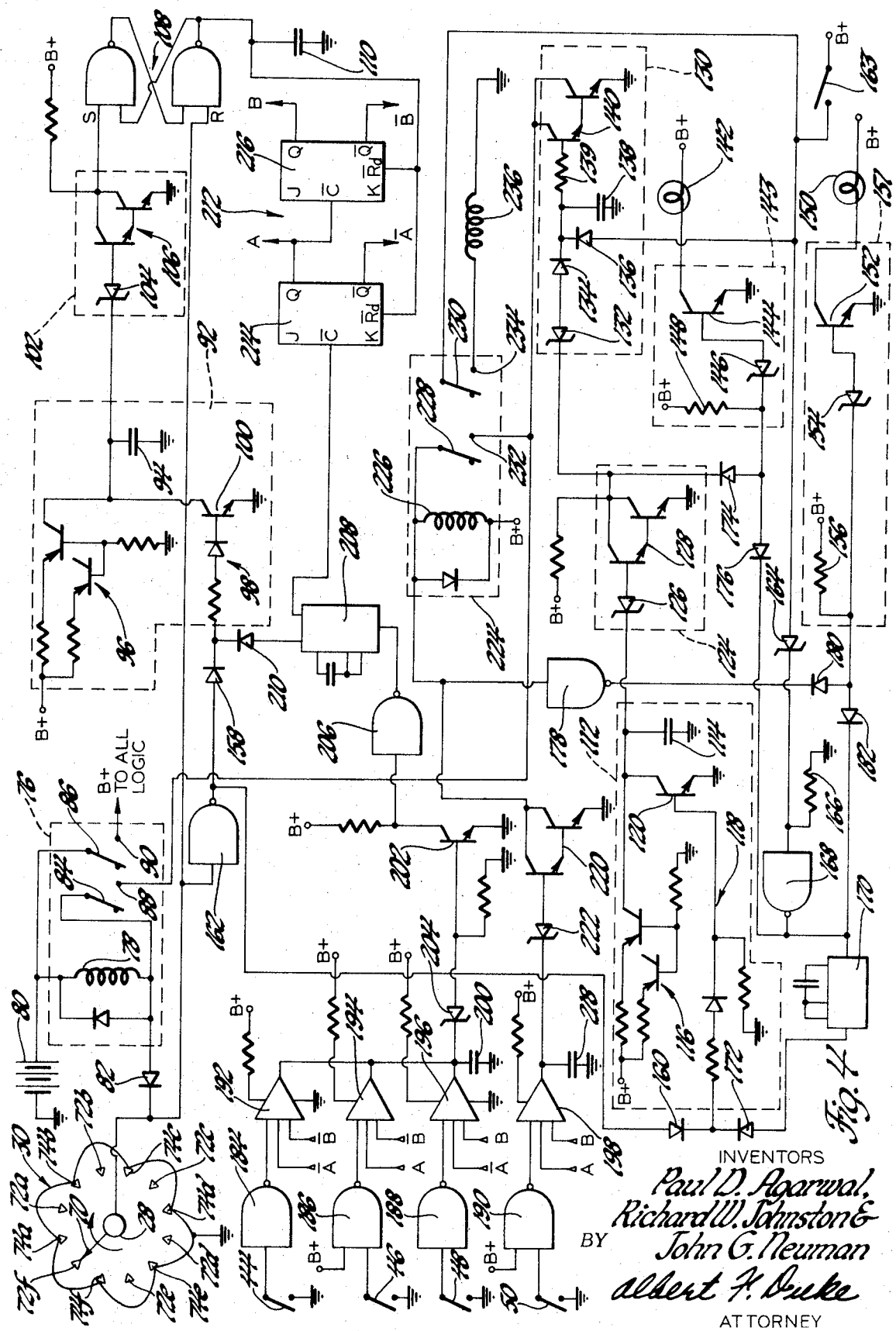
FIG. 4 is a schematic diagram of the control system of the present invention.

Referring now to FIG. 4, the rotary switch 30 includes a movable contact 70 driven from the shaft 28. The switch 30 is schematically shown to include a plurality of overridable stop or detent positions 72a through 72f located approximately 60° apart. Intermediate the detent positions are stationary contacts 74a through 74f which are engaged by the movable contact 70 during movement thereof between the detent position 72a through 72f. Each of the contacts 74a through 74f are grounded as shown.

A relay generally designated 76 comprises a relay coil 78 connected between a battery 80 and the switch 30 through a diode 82 so as to be momentarily energized upon movement of the contact 70 between the detent positions. The relay coil 78 operates armatures 84 and 86 from the position shown to a position engaging stationary contacts 88 and 90. Engagement with the contact 90 supplies battery voltage to the remaining logic circuitry in the system. Engagement with the contact 88 provides a hold-in or latching circuit for the relay coil 78 as will be explained hereinafter.

A short interval timer which is preferably designed to time out at approximately 2 seconds is generally designated 92 and includes a timing capacitor 94, a constant current source generally designated 96, and a switching transistor 100 which provides a discharge path for the capacitor 94. The current source 96 is also connected with a threshold network generally designated 102 which includes a zener diode 104 and a current amplifier 106. When capacitor 94 is charged sufficiently to break down the zener diode 104 base drive current from the source 96 is applied to the amplifier 106. The amplifier 106 controls the application of B+ to the set input of a set-reset flip-flop generally designated 108. The reset input of the flip-flop 108 is connected with the switch 30. The output of the set-reset flip-flop 108 is connected to ground through a capacitor 110.

A relatively long interval timer which is preferably designed to time out at approximately 30 seconds is generally designated 112 and is similar to the timer 94. The timer 112 includes a timing capacitor 114. A constant current source generally designated 116 provides charging current to the capacitor 114 and a reset circuit generally designated 118 which includes a switching transistor 120 provides a discharge path for the capacitor 114. The current source 116 is also connected with a threshold network generally designated 124 including a zener diode 126 and a current amplifier 128. When the capacitor 114 is charged sufficiently to break down the zener diode 126 base drive current is supplied to the amplifier 128. The amplifier 128 controls the application of B+ to a latching network for the relay 76 which is generally designated 130. The latching network 130 comprises a zener diode 132, a diode pair consisting of diodes 134 and 136, a capacitor 138, a resistor 139 and a current amplifier 140. The current amplifier 140 is connected with the stationary contact 88 of the relay 76 and when rendered conductive provides a ground path for the relay 76 through the contact 88.

A lamp 142 appropriately located within the switch mechanism 10 for illuminating the inner and outer plates 20 and 22 is connected across the battery 80 through a lamp control network generally designated 143. The network 143 includes a switching transistor 144 having its base connected to the battery 80 through a zener diode 146 and a resistor 148. Similarly, a "ready" lamp 150 suitably mounted in the dash of the vehicle is connected across the battery 80 through a lamp control network generally designated 151. The network 151 includes a switching transistor 152 having its base connected to the battery 80 through a zener diode 154 and a resistor 156.

The reset networks 98 and 118 are connected through diodes 158 and 160 respectively and an inverter 162 to the rotary switch 30 so that the timing capacitors 94 and 114 are discharged through the transistors 100 and 120 respectively by the momentary engagement of the contact 70 with any of the contacts 72a through 72f. The reset network 118 is also connected to be energized from the ignition switch 163 of the vehicle through a zener diode 164, an inverter 168, a monostable multivibrator 170 and a diode 172 for the purpose of permitting restarting of the vehicle as will be explained more fully hereinafter. A pull down resistor 166 maintains a low input to the inverter 168 when the ignition switch 163 is open. The control circuit 143 for the lamp 142 is also connected to the amplifier 128 through a diode 174 and to the output of the inverter 168 through a diode 176. The control circuit 151 for the lamp 150 is connected to the output of an inverter 178 through a diode 180 and to the output of the inverter 168 through a diode 182.

The switches 44 through 50 are connected through inverters 184, 186, 188 and 190 respectively to one input of AND gates 192, 194, 196 and 198 respectively. The output of the gates 192, 194 and 196 are OR'ed together and connected to ground through a capacitor 200 and to a switching transistor 202 through a zener diode 204. The capacitor 200 provides noise immunity for the gates 192, 194 and 196. Transistor 202 inverts the logic signal output of the gates 192, 194 and 196 and applies it to an inverter 206 having its output connected with a monostable multivibrator 208. The high going output of the multivibrator 208 is applied through a diode 210 to the reset network 98 of the short interval timer 92 while the low going pulse output is applied to the clock input $\overline{C}$ of a two stage register 212 comprising JK flip-flops 214 and 216. The $R_d$ inputs of the register 212 are connected with the output of the flip-flop 108. The Q and $\overline{Q}$ output of each stage of the register 212, designated A, B and $\overline{A}$, $\overline{B}$ are connected with the AND gates 192 through 198 as shown.

The output of the gate 198 is connected to ground through a capacitor 218 and to a relay control amplifier 220 through zener diode 222. The capacitor 218 provides noise immunity for the gate 198. The amplifier 220 when rendered conductive energizes a relay generally designated 224 which comprises a relay coil 226 which operates armatures 228 and 230. The armature 228 when actuated engages a stationary contact 232 connected with the latching circuit 130 while the armature 230 when actuated engages a stationary contact 234 thereby connecting the starter solenoid 236 of the vehicle across the battery 80 through the ignition switch 163. The output of the amplifier 220 is also connected as the input to the inverter 178.

With reference to FIGS. 1 through 4, the operation of the system is as follows:

To start the vehicle the operator inserts the ignition key in the slot 60 of the inner plate member 20 and rotates the plate 20 through 60° from the present detent position of the switch 30 to the next detent position of the switch 30. Such rotation momentarily energizes relay coil 78 applying battery voltage to the remainder of the circuitry shown in FIG. 4. When B+ is applied the set input to the flip-flop 108 goes high producing a high output. The capacitor 110, however, momentarily holds the $\overline{R}_d$ inputs to the register 212 low which insures that the $\overline{A}$ and $\overline{B}$ outputs of the register 212 are high. Simultaneously, with the application of B+ to the timers 92 and 112, a high is applied to the reset networks 98 and 118, through inverter 162, thereby shorting the timing capacitors 94 and 114 and preventing any current flow from the current sources 96 and 116 to the amplifiers 106 and 128. Accordingly, B+ is applied to the latching circuit 130 rendering the amplifier 140 conductive and providing a ground for the relay coil 78 through the contact 88. Since the ignition switch 163 is open at this time the pull down resistor 166 maintains a low input to the inverter 168 and consequently a high output from the inverter 168. The diodes 174 and 176 are thus back-biased and the zener diode 146 in the lamp control circuit 143 conducts to supply base drive to the transistor 144 which energize the lamp 142 and illuminates the inner and outer plates 20 and 22 of the switch mechanism 10.

Illumination of the inner and outer plates 20 and 22 informs the vehicle operator that the physiological test is to commence which involves removing the ignition key from the slot 60 in the inner plate 20 and sequentially inserting the ignition key in the slots 62 through 68 in that order. It will be noted that the rotation of the inner plate 20 has reoriented the slots 62 through 68 relative to each other and has reoriented the angle at which the ignition key must be inserted.

This reorientation insures that the driver will be required to exhibit visual and manual dexterity each time the vehicle is to be operated. With the many different orientations of the outer plate 22 resulting from the 60° detent positions of the inner plate 20, it is unlikely that the driver will become accustomed by use to the pattern of the slots 60 through 68. As previously indicated, the A and B outputs of the register 212 are both high and consequently, if the ignition switch is inserted in the slot 62 the switch 44 will place a low at the input to the inverter 184 and consequently, a high to the input of the AND gate 192. The output of the gate 192 thus switches to a high rendering the transistor 202 conductive and placing a high at the output of the inverter 206. The multivibrator 208 responds by triggering the reset circuit 98 discharging the capacitor 94 and also by clocking the register 212 which shifts to its next state, i.e., A and $\bar{B}$ high. With A and $\bar{B}$ both high insertion of the ignition switch in the slot 64 will cause a high output from the gate 194 which causes the multivibrator 208 to reset the timer 92 and clock the register 212 to its next state wherein $\bar{A}$ and B are high. A similar sequence of events occur if the operator now inserts the ignition key in the slot 66 closing the switch 48 and shifting the register 212 to a state leaving A and B both high. Insertion of the ignition switch in the final slot 68 switches the output of the gate 198 to a high rendering the amplifier 220 conductive and energizing the relay coil 226. The resultant closure of the contact 232 supplies a hold-in circuit through the amplifier 140 for the relay 226. Closure of the contact 234 places the starter solenoid 236 of the vehicle in circuit with the ignition switch 163. When the amplifier 220 conducts placing a low at the input of the inverter 178 the resultant high output of the inverter 178 back-biases the diode 180 which causes breakdown of the zener diode 154 permitting base drive to the transistor 152 which energizes the lamp 150 indicating to the driver that the test has been passed and that closure of the ignition switch 163 will energize the starter solenoid 236.

When the ignition switch 163 is closed base drive is applied to the amplifier 140 through the diode 136 maintaining the relay coils 78 and 226 in their energized state. The input to the inverter 168 is high so that the output of the inverter 168 is low which grounds the base drive to transistors 114 and 152 through the diodes 176 and 182 respectively, deenergizing the lamps 142 and 150 respectively. When the ignition switch is subsequently open the input to the inverter 168 goes low, as a result of the pulldown resistor 166, and the output of the inverter 168 goes high triggering the multivibrator 170. The multivibrator 170 applies a pulse to the reset network 118 through the diode 172 rendering the transistor 120 conductive which shorts the timing capacitor 114 to ground thus resetting the thirty second timer 112. During the short time interval that the timer 112 is being reset the charge stored on the capacitor 138 supplies enough base drive through the resistor 139 to keep the amplifier 140 conductive and the relays 78 and 226 energized. After the timer 112 is reset base drive is supplied to the amplifier 140 through the zener diode 132 and the diode 134. Thus during the 30 second interval corresponding to the charging of the capacitor 114 the vehicle can be re-started without performing the above-described test.

If too much time is taken in actuating any one of the switches 44 through 50, such time being determined by the timer 92, the capacitor 94 will charge sufficiently to break down the zener diode 104 thereby rendering the amplifier 106 conductive. When the amplifier 106 conducts a low input is applied to the flip-flop 108 producing a low output at the flip-flop 108 which is applied to the $\bar{R}_d$ inputs of the register 212, disabling the clock inputs $\bar{C}$, thus requiring that the test be reinitiated by rotating the inner plate 20. Also, unless the ignition switch 163 is closed within thirty seconds after initiation of the test the timer 112 will energize the threshold circuit 124 thus rendering the amplifier 140 nonconductive and deenergizing the relay 78 and 220, thereby open circuiting the starter solenoid 236 and removing B+ from the circuit.

We claim:

1. Apparatus for preventing operation of a motor vehicle by an incapacitated person comprising control means for either inhibiting or permitting operation of the vehicle, at least first and second rotatable members, means rotatably supporting said members and including gear means coupling said members one to the other to produce rotation of one member in response to rotation of the other member, each of said members being provided with at least one opening therein for receiving an appropriate switch actuating device, means for rotating one of said members to reorient the relative positions of said openings in said members, first switch means actuable in response to rotation of said one of said members, second switch means associated with each opening in said first and second members and actuable in response to insertion of said actuating device, logic means energizable in response to actuation of said first switch means and responsive to actuation of said second switch means in a predetermined sequence and within a predetermined time interval for conditioning said control means to permit operation of said vehicle.

2. The apparatus defined in claim 1 wherein said first switch means includes detent means providing a plurality of releasable stop positions and contact means momentarily engagable in response to movement of said one of said members between said stop positions.

3. A motor vehicle operation inhibitor comprising control means for inhibiting or permitting operation of said vehicle, at least first and second rotatable members, means rotatably supporting said members and including gear means coupling said members one to the other to produce rotation of one member in response to rotation of the other member, means for rotating one of said members, each of said members being provided with at least one opening therein for receiving an appropriate switch actuating device, switch means actuable in response to insertion of said actuating device, momentary contact means actuable in response to rotation of said one of said members, logic means responsive to actuation of said switch means in a predetermined sequence and within a predetermined time interval for conditioning said control means to permit operation of said vehicle.

4. A motor vehicle operation inhibitor comprising control means for normally inhibiting operation of said vehicle but energizable to permit operation of said vehicle, a member provided with a plurality of openings therein for receiving a switch actuating device, means rotatably supporting said member, means for rotating said member to any of a plurality of detented positions to thereby reorient the openings in said member, first switch means actuable during rotation of said member between said detented positions, second switch means actuable in response to insertion of said actuating device into any one of said plurality of openings in said member, logic means energizable in response to actuation of said first switch means and responsive to sequential actuation of said second switch means in a predetermined sequence and within a predetermined time interval for energizing said control means.

5. A motor vehicle operation inhibitor comprising control means normally inhibiting operation of said vehicle but energizable to permit operation of said vehicle, a manually operable switch mechanism including a housing of substantially cylindrical shape having an axis, inner and outer rotatably supported concentrically mounted plate members forming a closure for one end of said housing, gear means coupling said inner and outer plate members to produce counterclockwise rotation of said outer member in response to clockwise rotation of said inner member, said inner member being provided with a centrally located flap, said inner and outer members being provided with additional slots located at different distances from and along different radii extending from said centrally located slot, a stationary switch plate means mounted within said housing, a plurality of movable concentric contact rings positioned adjacent respective ones of said additional slots and adapted to complete an electrical path with said stationary switch plate means in response to insertion of a suitable switch actuating means in said additional slots, rotary switch means including a plurality of detented open circuited positions and intermediate circuit closing positions and actuable by said inner member to momentarily close a circuit during rotation of said inner member between said detented positions, logic means responsive to momentary closure of said circuit and to actuation of said plurality of movable contact means in a predetermined sequence and within a predetermined time duration thereafter to energize said control means.

* * * * *